(12) United States Patent
Hillmantel et al.

(10) Patent No.: US 7,389,867 B2
(45) Date of Patent: Jun. 24, 2008

(54) SYSTEMS AND METHODS FOR ORIENTING AND CONVEYING ARTICLES

(75) Inventors: Albin J. Hillmantel, St. Petersburg, FL (US); Joseph J. Hanlon, Trinity, FL (US)

(73) Assignee: Scandia Technologies, Largo, FL (US)

( * ) Notice: Subject to any disclaimer, the term of this patent is extended or adjusted under 35 U.S.C. 154(b) by 135 days.

(21) Appl. No.: 11/138,217

(22) Filed: May 27, 2005

(65) Prior Publication Data

US 2006/0266620 A1   Nov. 30, 2006

(51) Int. Cl.
B65G 47/24   (2006.01)
(52) U.S. Cl. .................. 198/395; 198/401; 198/415; 198/778
(58) Field of Classification Search ............... 198/395, 198/401, 415, 778
See application file for complete search history.

(56) References Cited

U.S. PATENT DOCUMENTS

| | | | |
|---|---|---|---|
| 1,931,454 A | 10/1933 | Anderson | |
| 1,946,458 A | 2/1934 | Evans et al. | |
| 3,580,379 A * | 5/1971 | Shuster et al. | ............... 198/401 |
| 4,044,897 A | 8/1977 | Maxted | |
| 5,092,451 A | 3/1992 | Jones et al. | |
| 5,145,049 A * | 9/1992 | McClurkin | .................. 198/374 |
| 5,400,896 A | 3/1995 | Loomer | |
| 5,518,103 A | 5/1996 | Achelpohl et al. | |
| 6,189,677 B1 * | 2/2001 | Ruf et al. | .................... 198/411 |
| 6,390,766 B1 * | 5/2002 | Craig et al. | .............. 414/794.5 |
| 6,471,039 B1 | 10/2002 | Bruun et al. | |
| 6,694,220 B1 * | 2/2004 | Tanz | ........................... 700/226 |
| 7,097,029 B2 * | 8/2006 | Halang | ....................... 198/779 |
| 2004/0104100 A1 | 6/2004 | Schlesser et al. | |

FOREIGN PATENT DOCUMENTS

DE   4205310 A1 *   8/1993

OTHER PUBLICATIONS

International Search Report dated Apr. 27, 2007 and PCT/ISA/237 (Six (6) pages).

* cited by examiner

*Primary Examiner*—Mark A Deuble
(74) *Attorney, Agent, or Firm*—Crowell & Moring LLP

(57) ABSTRACT

Systems and methods for article conveyance and orientation are provided. The system includes first and second conveyors, which convey articles in a conveying direction. The system also includes first and second sensors, which detect articles conveyed on the first and second conveyors, and which are coupled to a controller. The controller, based on information received from the first and second sensors, controls the first and second conveyors to orient the articles so that the articles have a size in a direction of conveyance which is greater than a size in a direction transverse to the direction of conveyance. The controller also controls the system to prevent another article from being conveyed onto the first and second conveyors when an article is being oriented.

24 Claims, 4 Drawing Sheets

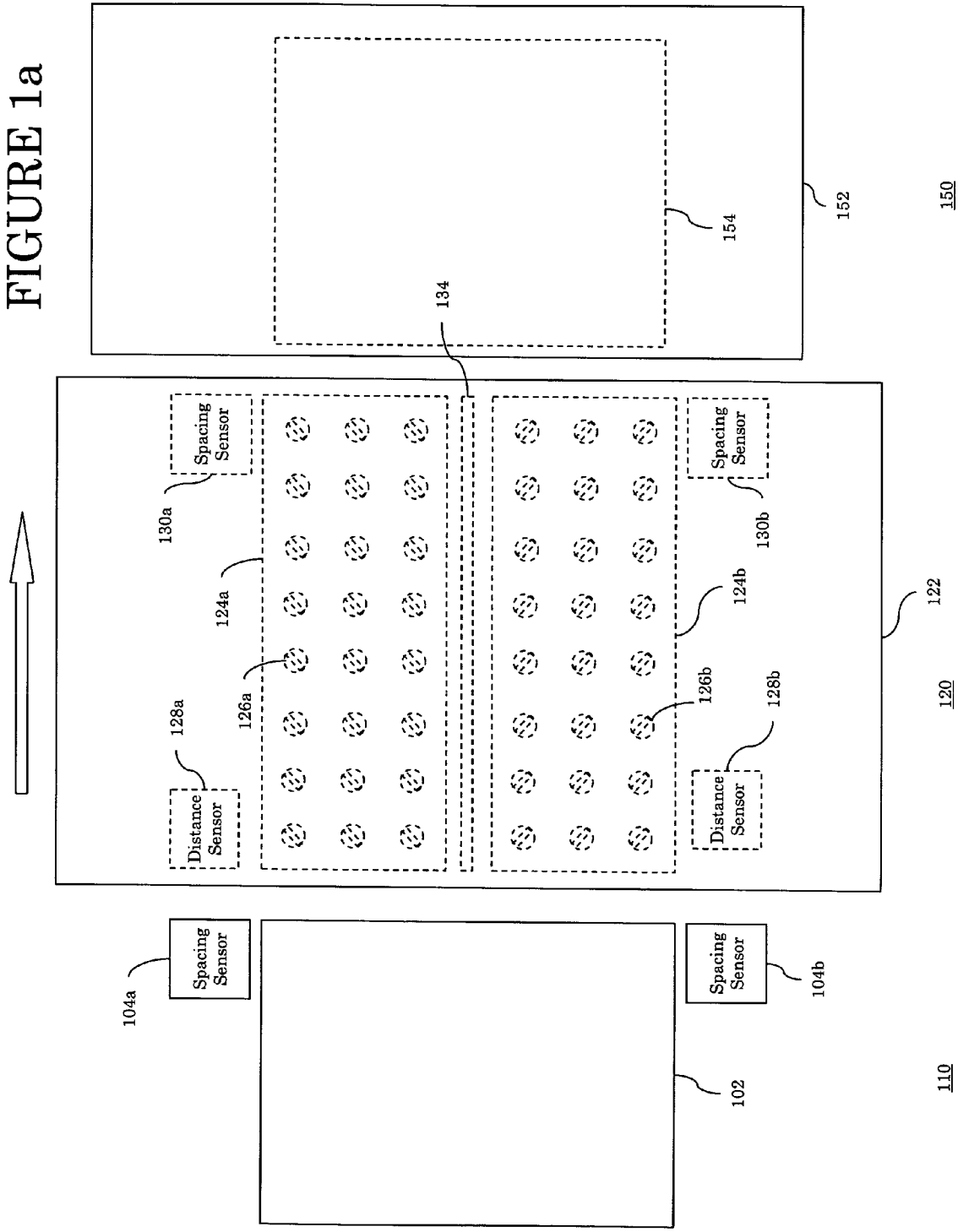

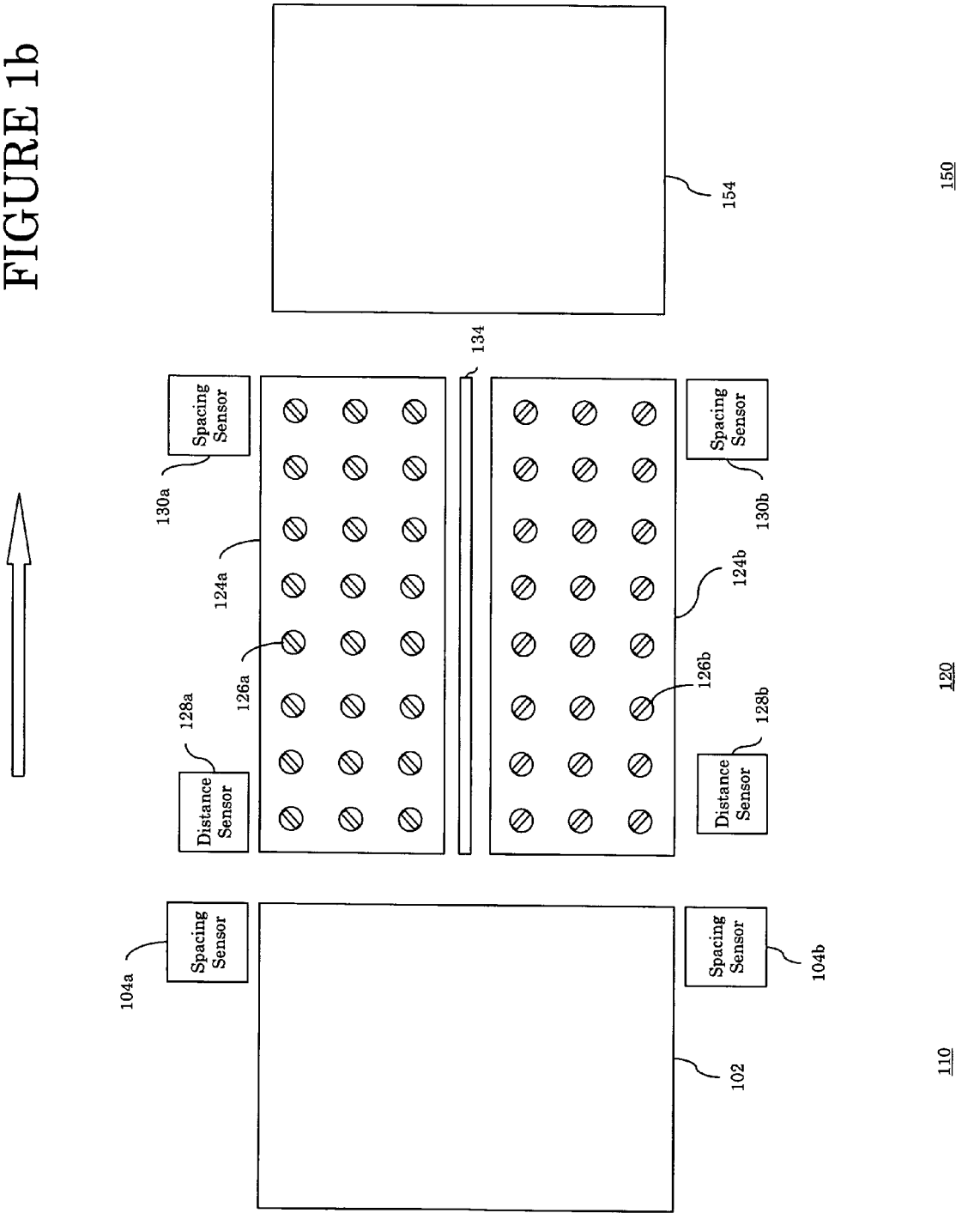

SYSTEMS AND METHODS FOR ORIENTING AND CONVEYING ARTICLES

FIELD OF THE INVENTION

The present invention is directed to a conveyor method and apparatus for moving items in a conveying direction. In particular, the conveyor system according to the invention includes an arrangement for reorienting articles which are being conveyed.

BACKGROUND OF THE INVENTION

Systems for conveying articles are deployed in a wide variety of applications. For example, in airports, conveyors are provided for security screening purposes. These conveyors are typically simplistic, in that they are designed solely for moving luggage and other articles in a conveyance direction through an x-ray scanning device. The entrance to the x-ray scanning device is of a limited size in a direction transverse to the direction of conveyance. Accordingly, if an article is larger in the direction transverse to the direction of conveyance than the size of the entrance to the x-ray scanning device, the article will get "jammed" in the entrance, preventing it and further upstream articles from being fed through the x-ray scanning device.

One technique for preventing articles from getting jammed in the entrance of an x-ray scanning device is to set the size of the conveyor leading to the x-ray scanning device to the same size as the entrance of the x-ray scanning device. Although this may reduce many jams, it may make it difficult for travelers, who would have to carefully place articles which are very close to the maximum size of the conveyor, onto the conveyor. Because travelers accompany their articles through the security screening area, and the area is operated by a large number of airport and/or security employees, airports typically provide wide conveyors leading into the x-ray scanning device (to ease the burden on travelers placing the articles on the conveyors), and rely upon the travelers and airport and/or security employees to reorient articles which jam the entrance of the x-ray scanning devices.

Conveyors and x-ray scanning devices are also used in airports for articles checked with airlines ("checked baggage"). Because of the large volume of checked baggage and the time demands to get the checked baggage onto airplanes, it is particularly desirable to reduce jamming of checked baggage.

Although the conveyor systems described above may provide adequate techniques for preventing and/or correcting articles from jamming x-ray scanning entrances, it would be desirable to reduce the reliance on human-intervention to reorient articles.

SUMMARY OF THE INVENTION

Systems and methods for article conveyance and orientation are provided. The system includes first and second parallel adjacent conveyors, which are operated in tandem to convey articles in a conveying direction. The system also includes first and second sensors, which detect articles conveyed on the first and second conveyors, and which are coupled to a controller. Based on information received from the first and second sensors, the controller controls the operation of the first and second conveyors to orient the articles so that the articles have a size in a conveying direction is greater than a size in a direction transverse to the conveying direction. The controller also controls the system to prevent another article from being conveyed onto the first and second conveyors when an article is being oriented.

Other objects, advantages and novel features of the present invention will become apparent from the following detailed description of the invention when considered in conjunction with the accompanying drawings.

BRIEF DESCRIPTION OF THE DRAWING FIGURES

FIG. 1a illustrates a plan view of the article orientation system in accordance with exemplary embodiments of the present invention;

FIG. 1b illustrates another plan view of the article orientation system in accordance with exemplary embodiments of the present invention;

DETAILED DESCRIPTION OF THE PREFERRED EMBODIMENTS

Figure 2:
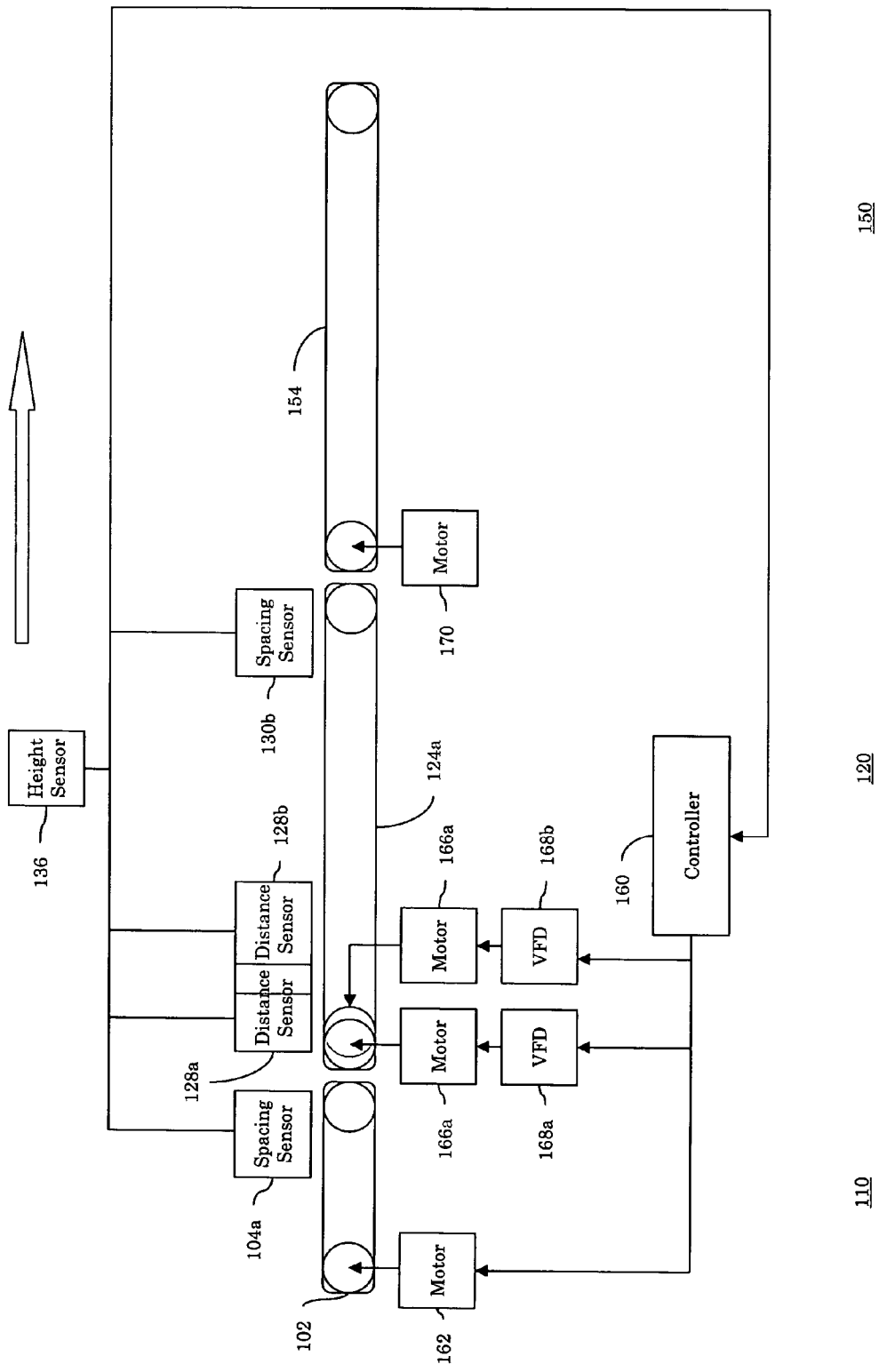
FIG. 2 illustrates a side, elevation view of the article orientation system in accordance with exemplary embodiments of the present invention.

FIGS. 1a and 1b are plan views, and FIG. 2 is a side elevation view, of the article orientation system in accordance with exemplary embodiments of the present invention. The article orientation system includes an in-feed conveyor component 110, an orientation conveyor component 120 and a scanning conveyor component 150. The in-feed conveyor component 110 includes an in-feed conveyor 102 and a set of spacing sensors 104a and 104b. The orientation conveyor component 120 includes a pair of orientation conveyors 124a and 124b, separated by a central panel 134, a pair of distance sensors 128a and 128b, and a pair of exit spacing sensors 130a and 130b. The spacing sensors 104a, 104b, 130a and 130b can be Series 6000 Transmitted Beam Photoelectric sensors, manufactured by Allen Bradley of Milwaukee, Wis. The distance sensors 128a and 128b can be BOD 66M Red Light, Class II Laser, Distance Sensors, manufactured by Balluff, Inc., of Florence Ky. Each of the conveyors 124a and 124b includes a plurality of rollers 126a and 126b, respectively, which are arranged on the conveyors at a 45° angle with respect to the central panel 134. The central panel 134 will be relatively flush with the conveying surface of orientation conveyors 124a and 124b. As illustrated in FIG. 1a, the elements of the orientation conveyor component 120 are included in a housing 122, which may be a lead-lined enclosure that reduces the radiation from scanning conveyor component 150.

The scanning conveyor component 150 includes a scanning conveyor 154, which is enclosed in a housing 152. The scanning conveyor component 150 also includes some type of scanning component (not illustrated), such as an x-ray or computerized tomography (CT) scanner. A horizontal clearance of an entrance to housing 122 in a direction transverse to the direction of conveyance is wider than that of housing 152. For example, if the system is used for conveying luggage, the horizontal clearance of the entrance to housing 122 can be 1 meter, while the clearance for housing 152 can be 0.8 meters.

The Figures illustrate distance sensor 128a being laterally displaced in the conveying direction from the distance sensor 128b. This arrangement avoids cross-talk between distance sensors 128a and 128b. The controller 160 is aware of the lateral displacement, and compensates for it when detecting the size and orientation of the articles.

As illustrated in FIG. 2, the orientation component 120 also includes a height sensor 136, which detects articles which are taller than the entrance of housing 122. If desired, a pair of height sensors, arranged on the left and right sides of the housing 122, can be employed.

The height sensor 136 and all other sensors are coupled to a controller 160, which can be a programmable logic controller (PLC), such as an Allen Bradley Micrologix 1500 PLC, an application specific integrated circuit (ASIC), a field programmable gate array (FPGA), a microprocessor, or the like. If an Allen Bradley PLC is employed, it can be programmed using RSLOGIX 500 ladder logic software.

Motor 162, which drives in-feed conveyor 102, is coupled to, and is controlled by, controller 160. Specifically, controller 160 can start or stop movement of in-feed conveyor 102 using, for example, a dry contact switch. If the in-feed conveyor 102 includes a mechanism for external control of the conveyor speed, the controller 160 can be coupled to such a mechanism. Motors 166a and 166b, which drive orientation conveyors 124a and 124b, are controlled by VFDs 168a and 168b, respectively, which in turn are controlled by controller 160. Motor 170 drives scanning conveyor 154. Motor 170 can be controlled using its own controller, or by controller 160 via a coupling (not illustrated). As will be described in more detail below, controller 160 controls the speed of conveyors 124a and 124b by providing an analog frequency reference to VFDs 168a and 168b, based upon information received from the various sensors.

Figure 3:
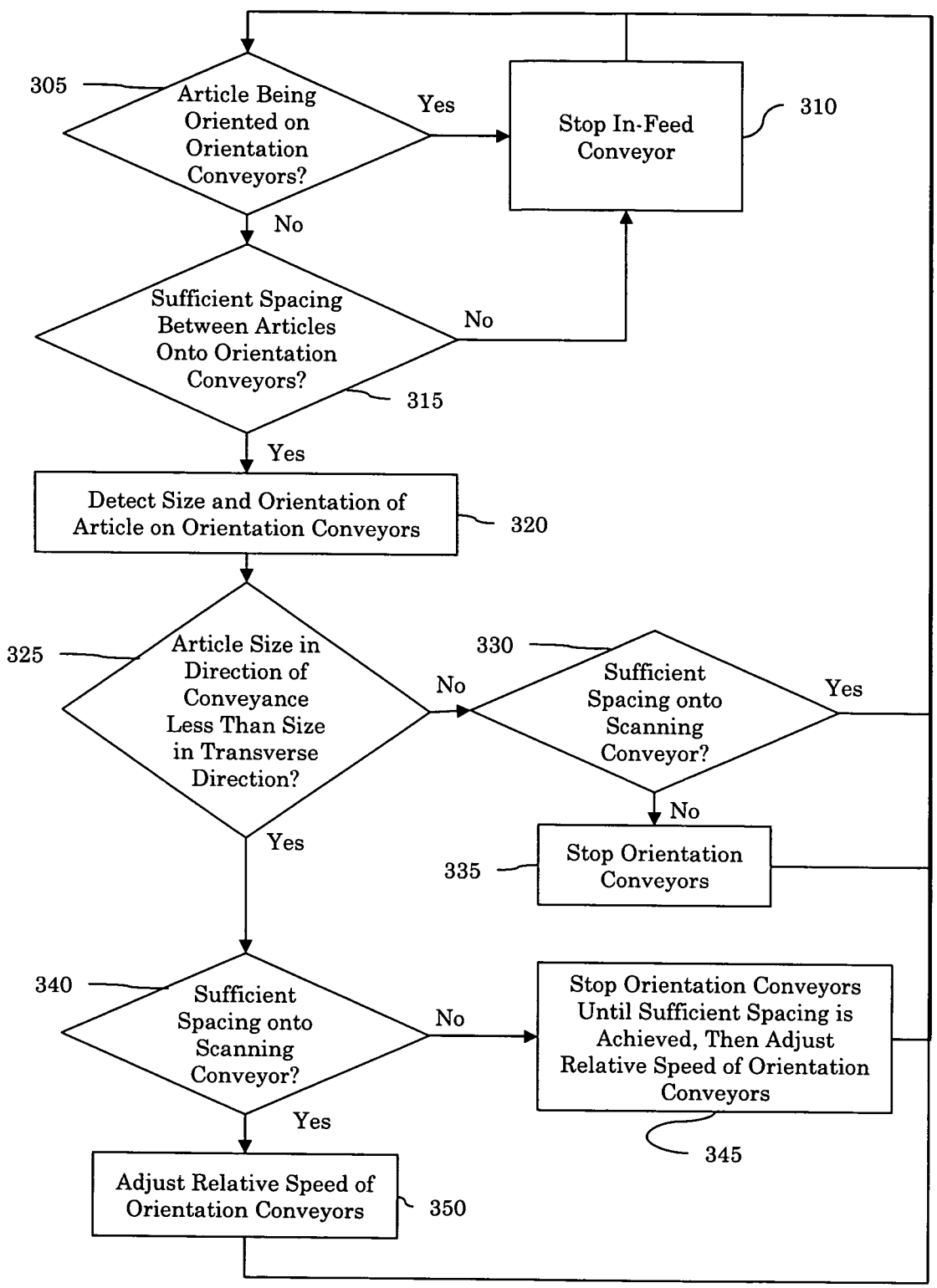
FIG. 3 illustrates an exemplary method for orienting articles in accordance with the present invention.

FIG. 3 illustrates an exemplary method for orienting articles in accordance with the present invention. The controller 160 determines whether an article is being oriented on the orientation conveyors 124a and 124b (step 305). As will be described in more detail below, the controller 160 controls the orienting of articles on conveyors 124a and 124b, and hence, will be aware of whether it is controlling the conveyors to orient an article. If an article is being oriented on the orientation conveyors 124a and 124b ("Yes" path out of decision step 305), then the controller 160 sends control signals to a dry contact switch (not illustrated) in order to stop motor 162, and in turn in-feed conveyor 102 (step 310). If in-feed conveyor 102 includes a speed control mechanism, controller 160 can instruct the mechanism to slow down the conveyor, when desired.

If an article is not being oriented on the orientation conveyors ("No" path out of decision step 305), then the controller 160 determines, using signals received from spacing sensors 104a and 104b, whether there is sufficient spacing between articles being conveyed onto the orientation conveyors 124a and 124b (step 315). Sufficient spacing can be based on a desired spacing onto the scanning conveyor; for baggage, for example, the desired spacing could be 4-6 inches, which provides a reasonable balance between throughput and allowing the scanner to recognize individual pieces of baggage. If there is not sufficient spacing between articles being conveyed onto the orientation conveyors 124a and 124b ("No" path out of decision step 315), then the controller 160 sends control signals to a dry contact switch (not illustrated) in order to stop motor 162, and in turn in-feed conveyor 102 (step 310). If in-feed conveyor 102 includes a speed control mechanism, controller 160 can instruct the mechanism to slow down the conveyor, when desired.

If there is sufficient spacing between articles being conveyed onto orientation conveyors 124a and 124b ("Yes" path out of decision step 315), then the controller 160 detects the size and orientation of the article on the orientation conveyors 124a and 124b (step 320). Specifically, the controller 160 uses information received from distance sensors 128a and 128b to determine the size and orientation of the article on orientation conveyors 124a and 124b. That is, the distance sensors 128a and 128b provide signals indicating the distance between the respective sensor and the article, and a length of the article in the direction of conveyance. Knowing the respective, predetermined, placement of the distance sensors 128a and 128b, the controller 160 can determine the size of the article in the direction transverse to the direction of conveyance by summing the distance each sensor detects, and subtracting the sum from the predetermined total distance between the distance sensors.

If controller 160 receives changing distance values from sensors 128a and 128b over the length of the article in the direction of conveyance, then the controller 160 concludes that orientation of the article on the conveyors 124a and 124b is skewed, and determines the apex of the article. The controller uses the apex of the article to avoid reorienting the article in a direction which would result in the article jamming. Specifically, because the housing 122 has particular width, articles on the conveyors 124a and 124b, which are longer than the width of the housing 122, will jam if the article is reoriented in one direction versus the other.

Based on the detected size and orientation of the article, the controller determines whether the article size in the direction of conveyance is less than a size in the transverse direction (step 325). If the controller 160 determines that the article size in the conveyance direction is greater than the size in the transverse direction ("No" path out of decision step 325), then the controller 160 concludes that it is not necessary to reorient the article, but determines whether there is sufficient spacing of articles on scanning conveyor 154 (step 330). The controller 160 determines if there is sufficient spacing onto the scanning conveyor 154, using exit spacing scanners 130a and 130b, which indicate whether an article is being passed to scanning conveyor 154. Specifically, the controller records a time when a previous article is passed onto scanning conveyor 154, and determines whether a predetermined amount of time has passed, the predetermined amount of time corresponds to the predetermined spacing desired.

If the controller 160 determines that there is sufficient spacing between articles as they enter scanning conveyor 330 ("Yes" path out of decision step 330), then the controller does not change the speed instructions to VFDs 168a and 168b, and orientation conveyors 124a and 124b continue to move in the conveyance direction at the previous speed. If, however, the controller 160 determines that there is not sufficient spacing onto the scanning conveyor 154 ("No" path out of decision step 330), then the controller 160 controls VFDs 168a and 168b to stop the orientation conveyors 124a and 124b. If the orientation conveyors 124a and 124b are of sufficient length, then the controller may control the absolute speed on the orientation conveyors 124a and 124b to slow down the conveyance of articles onto scanning conveyor 154.

If the controller 160 determines that the article size in the direction of conveyance is less than the size in the transverse direction ("Yes" path out of decision step 325), then the controller 160 determines whether there is sufficient spacing onto the scanning conveyor (step 340). If there is not sufficient spacing on the scanning conveyor ("No" path out of decision step 340), then the controller 160 stops the orientation conveyors 124a and 124b until there is sufficient spacing and then adjusts the relative speed of orientation conveyors 124a and 124b (step 345). If the orientation conveyors 124a and 124b are of sufficient length, then the controller may control the absolute speed on the orientation conveyors 124a and 124b to slow down the conveyance of articles onto scanning conveyor 154.

The relative speed of the orientation conveyors can be adjusted in a number of different ways. For example, the speed of one conveyor can be increased, while the speed of the other conveyor is maintained at its previous speed; the speed of one conveyor can be decreased (or stopped), while the speed of the other conveyor is maintained; or the speed of one conveyor can be increased, while the speed of the other conveyor is decreased (or stopped). If the orientation conveyors 124a and 124b are stopped to adjust the spacing, the controller stores an indication of where in the reorientation process it is, so that once the conveyors are restarted, the controller continues reorienting from where it left off. If, however, there is sufficient spacing on the scanning conveyor 154 ("Yes" path out of decision step 340), then the controller 160 adjusts the relative speed of orientation conveyors 124a and 124b (step 350).

The controller 160 can also control the in-feed, orientation and scanning conveyors in response to a variety of other conditions. For example, if a door to housing 122 is opened, then the controller will stop the movement of the conveyors. The controller 160 can also stop the conveyors in response to any type of system fault. Additionally, if a jam is detected, then the controller can cause the orientation conveyors to move the jammed article in the opposite direction, so that another attempt at reorientation can be performed.

For ease of explanation, and not limitation, FIG. 3 has been described with steps 305-315 being performed before steps 320-350. However, steps 305-315 can also be performed in parallel with steps 320-350. Additionally, a size threshold can be employed in decision step 325. For example, if an article is less than a predetermined size in the direction transverse to the direction of conveyance, the controller can determine that it is not necessary to reorient the article, because the article is not of such a size as to be likely to cause a jam at the entrance to the scanning conveyor.

The method described above in connection with FIG. 3 will be performed by the controller 160, based on information received from the various system sensors. Accordingly, the controller will include logic for performing the steps of the method described above, which can be hard-wired logic or program code.

The article conveyance and orientation system described above is particularly useful for conveying and reorienting luggage for security screening purposes. When the orientation conveyors are five feet long, and travel at 7.1 inches per second, luggage can be reoriented within approximately 4.5 seconds. Moreover, the size and orientation of the luggage can be determined within three seconds of travel on the orientation conveyors.

Exemplary embodiments have been described with the orientation conveyor component 120 including a housing and being adjacent to the scanning conveyor component 150. However, conventional conveyor systems, such as luggage conveyor systems, may already include another conveyor component, adjacent to the scanning conveyor component, with a housing for reducing radiation. Accordingly, the orientation conveyor component 120 of the present invention can replace the another conveyor component. Alternatively, the orientation conveyor component can be arranged adjacent to the another conveyor component, upstream in the conveying direction, without the housing for reducing radiation.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for conveying articles, the system comprising:
   an orientation conveyor component, which includes
      first and second belt conveyors, which convey an article in a direction of conveyance, wherein the first and second belt conveyors each include a plurality of centering rollers;
      first and second sensors, which detect the article conveyed on the first and second conveyors;
   an in-feed conveyor component, which includes
      first and second spacing sensors, and
      an in-feed conveyor; and
   a controller coupled to the first and second sensors,
   wherein, based on information received from the first and second sensors, the controller controls the first and second belt conveyors to adjust a spatial orientation of the article to a desired spatial orientation, and
   wherein the controller controls the in-feed conveyor to prevent another article from being conveyed onto the first and second belt conveyors when an article is being adjusted.

2. The system of claim 1, wherein the orientation of the article is adjusted so that the article has a size in the direction of conveyance which is greater than a size in a direction transverse to the direction of conveyance.

3. The system of claim 1, wherein the orientation conveyor component includes a housing that encloses the first and second belt conveyors and first and second sensors.

4. The system of claim 1, wherein the first and second sensors detect a first and second distance between the sensors and the article, respectively, and the controller determines an initial size of the article in the direction of conveyance, in the direction transverse to the direction of conveyance, and an apex location of the article.

5. The system of claim 4, wherein the controller controls a speed of the first and second belt conveyors to adjust the orientation of the article.

6. The system of claim 5, wherein the controller controls the relative speed of the first and second belt conveyors to adjust the orientation of the article, and an absolute speed of the first and second belt conveyors to control article conveyance to another conveyor.

7. The system of claim 6, wherein the relative speed is controlled by stopping one of the first and second belt conveyors, while the other conveyor continues to move in the direction of conveyance.

8. The system of claim 6, wherein the relative speed is controlled by slowing the movement of one of the first and second belt conveyors.

9. The system of claim 1, wherein the controller comprises:
   logic for sensing the spatial orientation of the article being conveyed in the direction of conveyance;
   logic for adjusting, using the first and second belt conveyors, the spatial orientation of the article to the desired spatial orientation; and
   logic for preventing the another article from being conveyed onto the first and second belt conveyors when the spatial orientation of the article is being adjusted.

10. The system of claim 1, wherein system further comprises:
   a scanning conveyor component, including a scanning conveyor,
   wherein the orientation conveyor component further comprises first and second exit spacing sensors, wherein the controller controls the in-feed conveyor and the first and second belt conveyors so that articles are conveyed onto the scanning conveyor with a predetermined spacing.

11. The system of claim 1, further comprising:

first and second variable frequency drives coupled to the first and second belt conveyors, respectively, wherein the controller controls the first and second belt conveyors using the first and second variable frequency drives.

12. The system of claim 10, wherein the scanning conveyor component includes a housing that encloses the scanning conveyor.

13. The system of claim 12, wherein the scanning conveyor component includes an x-ray or computerized tomography scanner enclosed in the housing.

14. A method for conveying articles, comprising the acts of:

sensing a spatial orientation of an article being conveyed in a direction of conveyance;

adjusting, using first and second belt conveyors, the spatial orientation of the article to a predetermined spatial orientation;

centering the article on the first and second belt conveyors by way of a plurality of rollers on each of the first and second belt conveyors;

preventing another article from being conveyed onto the first and second belt conveyors when the spatial orientation of the article is being adjusted; and conveying the article onto another conveyor, wherein the spatial orientation of the article is adjusted by controlling the relative speed of the first and second belt conveyors, and the article conveyance onto the another conveyor is controlled by controlling an absolute speed of the first and second belt conveyors, and wherein the relative speed is controlled by stopping one of the first and second belt conveyors, while the other belt conveyor continues to move in the direction of conveyance.

15. The method of claim 14, wherein the spatial orientation is adjusted so that the article has a size in the direction of conveyance which is greater than a size in a direction transverse to the direction of conveyance.

16. The method of claim 14, wherein the act of sensing the spatial orientation of the article comprises the acts of:

detecting a first and second distance between the article and a first and second sensor, respectively;

determining an initial size of the article in the direction of conveyance;

determining an initial size of the article in a direction transverse to the direction of conveyance; and determining an apex location of the article.

17. The method of claim 14, wherein the article is adjusted by controlling the speed of first and second belt conveyors, in the direction of conveyance.

18. A system for conveying articles, the system comprising:

first and second belt conveyors, which convey an article in a direction of conveyance and which are arranged in parallel in the direction of conveyance, wherein each of the first and second belt conveyors include a plurality of centering rollers;

first and second distance sensors arranged to transmit a beam parallel to a surface of the first and second conveyors, the first and second distance sensors are laterally displaced in the direction of conveyance, and the first and second distance sensors arranged to detect the article conveyed on the first and second belt conveyors;

a controller coupled to the first and second distance sensors, wherein, based on information received from the first and second distance sensors, the controller controls the first and second belt conveyors to adjust a spatial orientation of the article to a desired spatial orientation, and wherein the controller controls an in-feed conveyor to prevent another article from being conveyed onto the first and second belt conveyors when an article is being adjusted.

19. The system of claim 18, wherein the orientation of the article is adjusted so that the article has a size in the direction of conveyance which is greater than a size in a direction transverse to the direction of conveyance.

20. The system of claim 18, wherein the first and second sensors detect a first and second distance between the sensors and the article, respectively, and the controller determines an initial size of the article in the direction of conveyance, in the direction transverse to the direction of conveyance, and an apex location of the article.

21. The system of claim 20, wherein the controller controls a speed of the first and second belt conveyors to adjust the orientation of the article.

22. The system of claim 21, wherein the controller controls the relative speed of the first and second belt conveyors to adjust the orientation of the article, and an absolute speed of the first and second belt conveyors to control article conveyance to another conveyor.

23. The system of claim 22, wherein the relative speed is controlled by stopping one of the first and second belt conveyors, while the other belt conveyor continues to move in the direction of conveyance.

24. The system of claim 22, wherein the relative speed is controlled by slowing the movement of one of the first and second belt conveyors.

* * * * *